June 30, 1953 — W. M. BUCHHOLZ — 2,643,660
FISHING LINE WASHING AND DRYING REEL
Filed Nov. 22, 1949
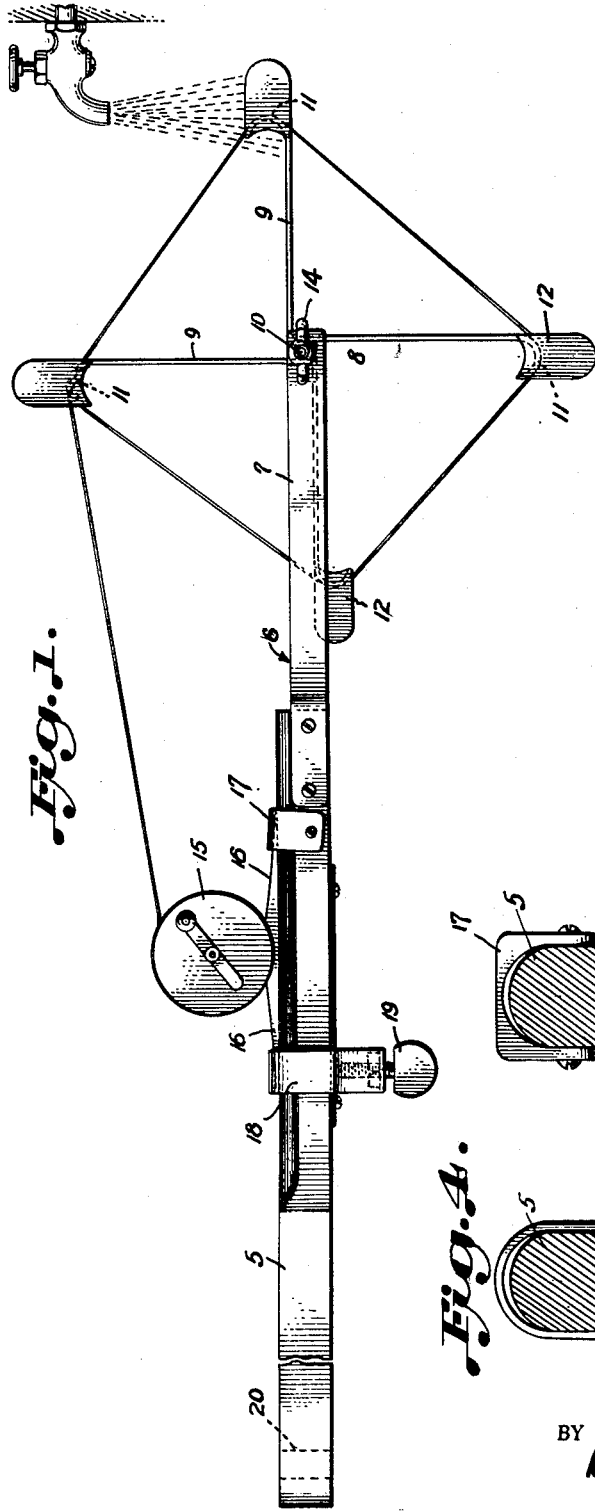
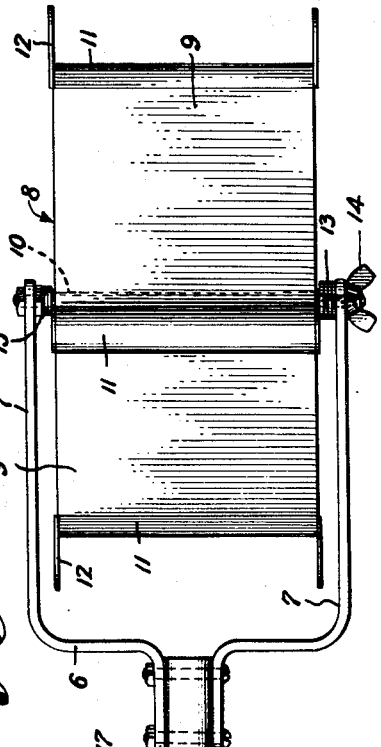
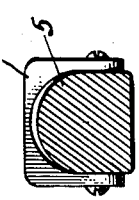
INVENTOR
WILLIAM M. BUCHHOLZ,
BY
ATTORNEY Patented June 30, 1953

2,643,660

UNITED STATES PATENT OFFICE 2,643,660

FISHING LINE WASHING AND DRYING REEL

William M. Buchholz, Miami, Fla.

Application November 22, 1949, Serial No. 128,714

1 Claim. (Cl. 134—138)

This invention is a fishing line washing and drying reel, having for its primary object to provide means whereby a line may be unwound from the ordinary fishing reel and wound upon a combined washing and drying reel under the impulse of liquid pressure.

A further object of the invention is to provide a line washing and drying reel of such character and construction that the line to be treated may be readily and easily wound upon the drying reel and at the same time be washed free of all foreign matter during the winding operation.

A still further object of the invention is to provide a line washing and drying structure involving a winding reel propelled by liquid pressure, the liquid involved acting as the cleansing agent for the line during the winding operation.

With the foregoing objects in view, together with others which will appear as the description proceeds, the invention consists in the novel construction, combination and arrangement of parts, all as will be described more fully hereinafter, illustrated in the drawing, and particularly pointed out in the claim.

In the drawing:

Fig. 1 is a side elevation of a combined washing and drying structure embodying the invention, Fig. 2 is a top plan view of the device as shown in Fig. 1, Fig. 3 is an enlarged transverse sectional view taken substantially upon line 3—3 of Fig. 2, and Fig. 4 is a similar view taken upon line 4—4 of Fig. 3.

Referring now more particularly to the drawing, 5 indicates a base or support which may include a shaft of relatively short length, formed either of metal or wood, and to one end of which is attached a yoke 6 which includes the spaced parallel arms 7. In instances where the base or support 5 is formed of wood, the yoke 6 will be formed preferably of metal so that the arms 7 may provide a certain degree of resiliency.

Mounted for rotation between the arms 7 of the yoke is a washing and drying reel indicated generally at 8. This reel includes a plurality of radial plates or blades 9, secured together at their inner ends to provide a hub portion rotatably mounted upon the shaft 10 which connects the ends of the yoke arms 7. The blades 9 are preferably bent at their free ends as at 11 to provide relatively shallow buckets as shown, and each blade has secured at its outer ends radially outstanding guides 12.

The shaft 10 extends from one of the arms 7 of the yoke to the other and, as stated, rotatably supports the reel 8. Spacing members indicated at 13 encircle the ends of shaft 10 and are interposed between the arms 7 and the adjacent ends of the reel 8, and a wing nut 14 is secured to one end of the said shaft 10.

The base or support 5 is provided with means of simple nature for the ready attachment thereto of the ordinary fishing line reel represented at 15. The reel has the usual outwardly diverging feet 16 for attachment to a fishing rod, and the shaft or base 5 is provided with a pivoted clip or clevis 17 to be engaged with one of the feet 16. A sliding clamp 18 encloses the shaft or base 5 at a distance from the clevis 17 so as to engage with the opposite foot 16 of the fishing line reel 15. The clamp 18 carries a set screw 19 to engage with the underside of the base or shaft 5 in order to bring pressure through the clamp 18 to the adjacent foot 16 to rigidly hold the fishing line reel affixed to the base or shaft 5.

The inner end of this base or shaft 5 constitutes a handle for the ready manipulation of the instrument, and an opening 20 may be provided in the handle end in order that the apparatus may be conveniently hung up when desired.

When it is desired to wash and dry the fishing line upon reel 15, the fishing reel is applied to the base and held securely thereon by the clevis 17 and the clamp 18. The free end of the fishing line is then led to the washing and drying reel and may be attached thereto in any convenient manner. The wing nut 14 is so adjusted as to permit free movement of the reel 8, whereupon the support is so held as to extend the impeller blades and their buckets 11 beneath the stream from a faucet as shown in Fig. 1. The pressure or weight of the water in striking the impeller blades 9 and being retained in the buckets 11 will be sufficient to rotate the reel, thus drawing the line from the fishing line reel 15 and winding the same upon the reel 8, at the same time causing the line to be thoroughly washed and freed of slime or other foreign and undesirable matter. When the line has been entirely unwound from the reel 15 and wound upon the larger reel 8, the instrument may be hung up for drying purposes, after which the line may be rewound upon the reel 15 by operating the handle thereof in the usual manner. In this operation, the wing nut 14 will be so operated as to bring about desirable tension between the two reels and so as to prevent overrunning.

From the foregoing it is apparent that the washing and winding operations are carried out simultaneously, the liquid pressure supplying the necessary impelling power as well as providing the cleansing medium. The arms 12 act as guides to assume proper winding of the line upon the washing and drying reel 8.

I claim:

A line washing and drying structure for use with a source of fluid supply, a support, means on said support for attaching a fishing line reel thereto, an elongated hub rotatably mounted on said support in spaced relationship with said reel and parallel with the latter, flat impeller blades equal in width to the length of said hub secured at their inner ends to the latter and projecting radially therefrom, and the outer ends of said blades bent upon themselves throughout their widths to provide buckets on their inner surfaces and to be engaged on their outer rounded surfaces by fishing line to be wrapped upon said reel.

WILLIAM M. BUCHHOLZ.

References Cited in the file of this patent

UNITED STATES PATENTS

| Number | Name | Date |
|---|---|---|
| 485,695 | Haworth | Nov. 8, 1892 |
| 769,548 | Laughton | Sept. 6, 1904 |
| 1,455,278 | Sundh | May 15, 1923 |
| 1,553,013 | Turman | Sept. 8, 1925 |
| 1,678,850 | Deming | July 31, 1928 |
| 2,141,579 | White | Dec. 17, 1938 |
| 2,339,688 | Eisenbeis | Jan. 18, 1944 |
| 2,384,032 | Jackson | Sept. 4, 1945 |
| 2,478,896 | Cobb | Aug. 16, 1949 |